United States Patent [19]
Plowman et al.

[11] 3,720,480
[45] March 13, 1973

[54] ROTOR CONSTRUCTION

[75] Inventors: James S. Plowman, Longmeadow, Mass.; Thomas C. Walsh, New Britain, Conn.

[73] Assignee: United Aircraft Corporation, East Hartford, Conn.

[22] Filed: June 29, 1971

[21] Appl. No.: 157,969

[52] U.S. Cl. ....................416/220, 416/221, 416/230
[51] Int. Cl. ....................F01d 5/32
[58] Field of Search......416/220, 230, 239, 248, 221, 416/229

[56] References Cited

UNITED STATES PATENTS

| | | | |
|---|---|---|---|
| 2,848,192 | 8/1958 | Hayes | 416/220 |
| 2,868,441 | 1/1959 | Reutt | 416/230 |
| 2,950,083 | 8/1960 | Compton et al. | 416/230 |
| 3,132,841 | 5/1964 | Wilder | 416/230 |
| 3,178,101 | 4/1965 | Morley et al. | 416/220 X |
| 3,309,058 | 3/1967 | Blackhurst et al | 416/220 |

*Primary Examiner*—Everette A. Powell, Jr.
*Attorney*—John D. Del Ponti

[57] ABSTRACT

A rotor construction comprising a hub having a plurality of undercut slots defining a plurality of lugs in the periphery thereof, a plurality of filament reinforced composite blades having splayed roots in the slots engaging the lugs and a reinforcing insert disposed in the root portion of the blades extending in a direction transverse to the rotor axis, the ends of the insert engaging opposing walls of adjacent lugs and being of a material sufficiently strong in compression to resist lug bending due to blade loss.

3 Claims, 6 Drawing Figures

34'
36
38
40

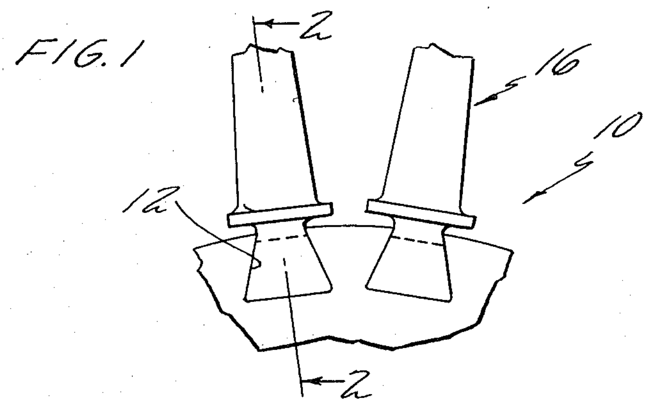
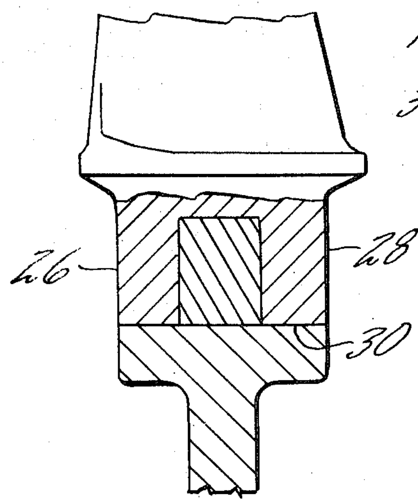
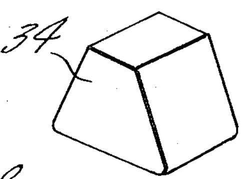
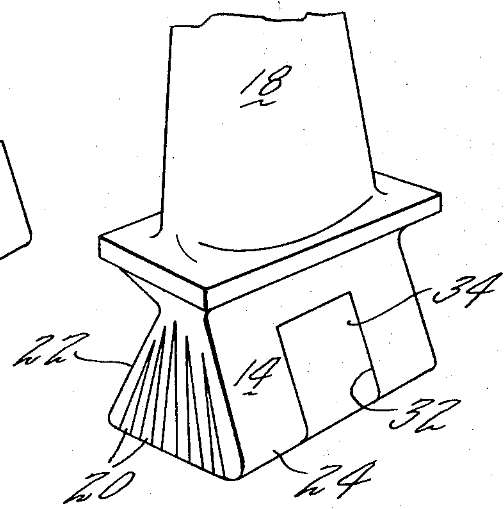
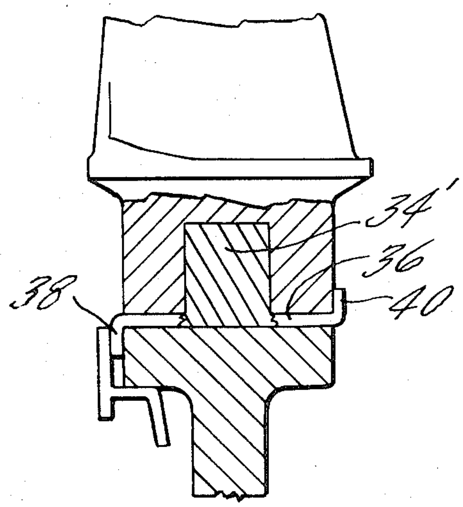
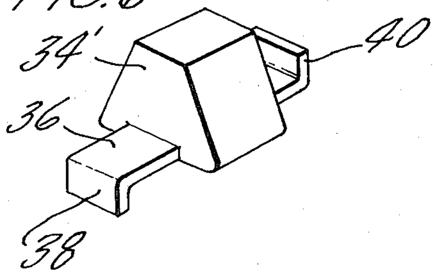
INVENTORS
JAMES S. PLOWMAN
THOMAS C. WALSH
BY
ATTORNEY

ROTOR CONSTRUCTION

The invention herein described was made in the course of or under a contract, or subcontract thereunder, with the Department of the Air Force.

BACKGROUND OF THE INVENTION

This invention relates to a rotor construction and more particularly to rotor construction including filament reinforced composite blades particularly suitable for use in compressors for gas turbine engines.

It is known to utilize filaments in the reinforcement of gas turbine engine components such as compressor blades. In particular, the potential for usage of high modulus, high strength filaments, such as silicon carbide, carbon, boron or boron with a thin protective coating of, for example, silicon carbide, in a resin or metal matrix is widely recognized.

One of the basic problems in utilizing filamentary reinforcements in blade structures, particularly in the smaller blades, resides in the means for mounting them in their rotor structure. Typically, a compressor blade requires an enlarged base or root portion formed for insertion in undercut slots in the periphery of the rotor. In one arrangement, as disclosed in copending application Ser. No. 95,232 to H. Stargardter filed Dec. 4, 1970 and assigned to the assignee of the present invention, it has been found advantageous to form the blade as a plurality of substantially parallel elongated laminations disposed in a stack one on the other, the laminations including elongated sheets of unidirectional reinforcing filaments embedded in a matrix material and aligned in a spanwise direction with the lower end of the stack having its laminations splayed outwardly with metallic inserts bonded therebetween to form an enlarged root portion extending chordwise of the blade. By their nature, however, filament reinforced composite blades, unlike metal alloy blades, are susceptible to failure in their root portion because of discontinuities or poor bonding therein. If such failure occurs, both the airfoil and root portion will be lost, creating a substantial imbalance in the lugs forming the vacant slot. This imbalance becomes especially critical in turbomachinery designed for the higher airfoil tip speeds since the tendency there is to maximize pitch and minimize thickness of the disk blade retaining lugs. Accordingly, it has become increasingly difficult to design disk lugs which will not fail when a blade is lost. The bending stresses which tend to bend the lugs inwardly toward the vacant slot create the risk of a runaway failure wherein all of the blades in sequence outwardly from the slot are lost. While the disk lugs are normally designed to operate below the yield strength of the disk material, it will be appreciated that loading of the lug due to a lost blade produces a combined tensile and bending stress exceeding the 0.2 percent yield strength of the material. This loading, as mentioned above, presents a real danger of bending and ultimate failure.

SUMMARY OF THE INVENTION

The present invention contemplates a rotor construction for a gas turbine engine including a hub having a plurality of undercut slots defining a plurality of lugs in the periphery thereof, a plurality of filament reinforced composite blades having splayed roots in the slots engaging the lugs and reinforcing inserts disposed in the root portion of the blades extending in a direction transverse to the rotor axis, the inserts having ends engaging opposing walls of adjacent lugs and being of a material sufficiently strong in compression to resist lug bending due to blade loss.

The present invention is particularly directed toward a means for preventing disk lug bending in a situation, as for example where there is blade loss, where the combined tensile and bending stresses on disk lugs exceed the 0.2 percent yield strength of the disk material.

In the preferred embodiment, the reinforcing insert is shaped and sized to conform to cross-sectional configuration of the slot so as to remain therein after loss of the blade root. In a modification of the inventive concept, there is provided, as an integral part of the reinforcing insert, a locking member for locking the blade in the slot to prevent axial separation from the disk.

BRIEF DESCRIPTION OF THE DRAWINGS

FIG. 1 is an axial section of part of a rotor assembly;

FIG. 2 is a fragmentary side view, in part section, of part of a rotor assembly;

FIG. 3 is a fragmentary perspective view of a blade;

FIG. 4 is a perspective view of a blade insert;

FIG. 5 is a fragmentary side view, in part section, of a part of a modified rotor assembly; and FIG. 6 is a perspective view of a modified blade insert.

DESCRIPTION OF THE PREFERRED EMBODIMENT

As seen in the drawings, a rotor disk 10 has a plurality of undercut grooves or slots 12 which receive the root portion 14 of a blade 16. The blade 16 has an airfoil portion 18 comprised of a plurality of laminations which are bonded together in a stack. Each lamination is preferably comprised of a plurality of sheets of unidirectional reinforcing filaments embedded in a matrix material and aligned in a substantially spanwise direction. Each sheet is preferably a monolayer tape of high strength, high modulus, nonductile filament such as those made of boron or other materials as indicated hereinbefore, and embedded in a suitable matrix, such as the high temperature resins, as for example polyimide, polybenzimidazole, polybenzothiozole, polyoxzdiazole and the like, the lower temperature resins, as for example epoxy, polyester, phenolic, acrylic and the like, or metals such as aluminum, magnesium, titanium and their alloys and the like. In general, the filaments are of a material having a modulus of elasticity of at least about $30 \times 10^6$ psi. Further, while each thin sheet layer of the parallel high modulus, high strength filaments and matrix need not be directionally aligned in a spanwise direction, the majority are so oriented in order to stiffen the blade in the direction of its longitudinal axis and substantially increase the bending modal frequency to a level above that of the operating frequencies to be encountered. Some of the sheet layers may be arranged at different angles with regard to the blade longitudinal axis to increase the torsional modal frequency of the blade. As will be appreciated by those skilled in the art, the orientation and combinations of layers may be varied in order to meet the requirements of the particular blade design. Referring to the drawings, it can be seen that the root portion 14 of the blade 16 is dovetailed and thereby adapted to be received by the axial slot 12 in the rotor 10 in the conventional manner. The dovetail, or splayed root, is defined by a particular splay radius of curvature which dimension is determined by various known factors, not particularly related to the size and stiffness of the filaments, to achieve proper dovetail footing. A preferred method of forming the root portion of a blade formed of a plurality of filament reinforced sheet layers laminated together is to splay the lower ends of the laminations outwardly from the longitudinal axis of the blade and to maintain them thusly by bonding metallic wedges 20 of, for example aluminum, therebetween. The blade root 14 includes pairs of oppositely directed longitudinally extending side faces 22 and 24 and end faces 26 and 28 as well as a bottom portion 30. In the bottom portion 30 there is provided a slot 32 which extends through the side faces 22 and 24 and which receives reinforcing insert 34. As is apparent from the drawings, the shape of the blade root 14 closely corresponds to the shape of the disk slot 12 with normal clearance provided. The insert 34 in like manner corresponds to the shape of the disk slot 12 and is made of a material, preferably a metal such as steel or titanium, which is sufficiently strong in compression to resist lug bending due to blade loss. The insert 34 is preferably bonded to the blade root.

As indicated hereinbefore, the tremendous potential of the filament reinforced composite blade has been clouded by increased risks of root failure resulting in root loss and the concomitant disk lug bending which occurs when the combined tensile and bending stresses exceeds the 0.2 percent yield strength of the disk lug material. By virtue of the present invention, that bending is counteracted by the insert 34 which is, in essence, independent of the blade 16 and remains in place whether or not said blade is present.

In FIGS. 5 and 6, a modification is presented wherein an insert locking means is shown. The locking means comprises an intermediate or flat portion 36 which is integral with the insert 34' and which extend outwardly therefrom. As shown in the drawings, the intermediate portion 36 is bounded at either end by locking tab portions 38 and 40 which are adapted to be bent in a conventional manner to retain the insert in the slot 12.

What has been set forth above is intended primarily as exemplary to enable those skilled in the art in the practice of the invention and it should therefore be understood that, within the scope of the appended claims, the invention may be practiced in other ways than as specifically described. It is to be understood, for example that instead of utilizing a single centrally disposed insert 34, it is contemplated that a plurality of inserts may be used.

What is claimed is:

1. A rotor construction comprising:
   a hub having undercut slots defining a plurality of lugs in the periphery thereof, a plurality of filament reinforced composite blades arranged around the periphery of the hub, each blade comprising high modulus, high strength filaments embedded in a matrix material and extending in general spanwise alignment to form an airfoil portion and an enlarged root portion, said enlarged root portion received in said slots engaging said lugs, and at least one reinforcing insert disposed in the root portion of said blades extending in a direction transverse to the rotor axis, the ends of said insert engaging the opposing walls of adjacent lugs, said insert being of a material sufficiently strong in compression to resist lug bending due to blade loss.

2. The invention of claim 1 wherein said blade root has a slot in its bottom portion extending through its side faces and said insert is received in said slot.

3. The invention of claim 2 wherein said insert is provided with locking means, said locking means comprising a pair of spaced bendable tab end portions joined by a flat axially extending intermediate portion, said intermediated portion being attached to said insert.

* * * * *